United States Patent
Buresh et al.

(10) Patent No.: US 10,100,414 B2
(45) Date of Patent: Oct. 16, 2018

(54) SURFACE MODIFIED MAGNETIC MATERIAL

(75) Inventors: Steve J. Buresh, Latham, NY (US); Paul A. Siemers, Clifton Park, NY (US); Jeremy Van Dam, West Coxsackie, NY (US); Raul Basilio Rebak, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 845 days.

(21) Appl. No.: 13/361,334

(22) Filed: Jan. 30, 2012

(65) Prior Publication Data

US 2013/0196145 A1    Aug. 1, 2013

(51) Int. Cl.
| | |
|---|---|
| *B32B 3/00* | (2006.01) |
| *B05B 3/10* | (2006.01) |
| *B32B 15/04* | (2006.01) |
| *C23C 28/02* | (2006.01) |
| *F16C 32/04* | (2006.01) |
| *H01F 7/02* | (2006.01) |
| *H01F 41/02* | (2006.01) |

(52) U.S. Cl.
CPC .......... *C23C 28/021* (2013.01); *C23C 28/023* (2013.01); *F16C 32/0468* (2013.01); *H01F 7/0221* (2013.01); *H01F 41/026* (2013.01); *F16C 2223/30* (2013.01); *F16C 2240/60* (2013.01); *Y10T 428/26* (2015.01); *Y10T 428/31678* (2015.04)

(58) Field of Classification Search
None
See application file for complete search history.

(56) References Cited

U.S. PATENT DOCUMENTS

| | | |
|---|---|---|
| 5,154,978 A | 10/1992 | Nakayama et al. |
| 6,214,473 B1 | 4/2001 | Hunt et al. |
| 6,435,835 B1 | 8/2002 | Allen et al. |

(Continued)

FOREIGN PATENT DOCUMENTS

| | | |
|---|---|---|
| EP | 2048390 A2 | 4/2009 |
| JP | 2008304052 A | 12/2008 |
| RU | 1363915 A1 | 3/1996 |
| RU | 2286500 C2 | 10/2006 |
| RU | 2347106 C2 | 2/2009 |
| SU | 169401 A | 4/1965 |

OTHER PUBLICATIONS

Standex Meder Electronics, <https://standexelectronics.com/resources/faq/faq-switches/>, date accessed: Jun. 2, 2016.*

(Continued)

*Primary Examiner* — Cheng Yuan Huang
(74) *Attorney, Agent, or Firm* — GE Global Patent Operation; Pabitra Chakrabarti

(57) ABSTRACT

An article exhibiting magnetic properties, a method for providing corrosion resistance to an article, and an electric machine element are disclosed. The article comprises a substrate comprising a first portion of a magnetic material, the magnetic material exhibiting magnetic properties. The article further comprises a transition layer comprising a second portion of the magnetic material and a first portion of a coating material. The transition layer is disposed on at least a portion of the substrate. The article further comprises an outer layer comprising a second portion of the coating material. The outer layer is disposed on at least a portion of the transition layer.

8 Claims, 2 Drawing Sheets

(56) References Cited

U.S. PATENT DOCUMENTS

| | | | |
|---|---|---|---|
| 6,491,842 | B1 | 12/2002 | Bonnemann et al. |
| 6,703,736 | B2 | 3/2004 | Wang et al. |
| 7,572,096 | B2 | 8/2009 | Nonaka et al. |
| 7,572,115 | B2 | 8/2009 | Klein et al. |
| 7,645,126 | B2 | 1/2010 | Sekiguchi et al. |
| 7,776,259 | B2 | 8/2010 | Deevi et al. |
| 7,847,454 | B2 | 12/2010 | Weeber et al. |
| 2003/0002227 | A1* | 1/2003 | Jarratt .......................... 360/319 |
| 2007/0151630 | A1* | 7/2007 | Iorio ....................... C22C 38/08 148/120 |
| 2007/0262668 | A1 | 11/2007 | Brisson et al. |
| 2008/0121315 | A1* | 5/2008 | Gigliotti et al. ............. 148/120 |
| 2008/0218008 | A1 | 9/2008 | Ghasripoor et al. |
| 2010/0239873 | A1 | 9/2010 | Giannozzi et al. |
| 2010/0327537 | A1 | 12/2010 | Johnson et al. |

OTHER PUBLICATIONS

Magnetic Sheets, Date acessed: Jul. 24, 2017 <http://www.mmcmagnetics.com/ourproducts/Flexible/LE_FlexSheets.htm>.*

Faqin et al. "A Study on the Properties of Nd—Fe—B Permanent Magnets with Ion Aluminum Coating", Magnetic material and apparatus, vol. No. 26, Issue No. 1, pp. 7-8, Jan. 1995.

Unofficial English Translation of Chinese Office Action issued in connection with corresponding CN Application No. 201380007347.2 dated Jul. 7, 2015.

Office Action issued in connection with related JP Application No. 2014-554938 dated Oct. 21, 2016.

Russian Office Action issued in connection with corresponding RU application No. 2014129395 dated Apr. 28, 2017.

* cited by examiner

SURFACE MODIFIED MAGNETIC MATERIAL

BACKGROUND OF THE INVENTION

The subject matter of the present disclosure generally relates to magnetic articles having a protective coating.

In various applications, such as in turbo machinery used for oil and gas equipment, the magnetic components of motors, generators, and magnetic bearings may be exposed to corrosive environments. For instance, in order for a magnetic bearing to operate in these potentially corrosive environments, the exposed portions of the magnetic bearing must offer corrosion resistance. The stator can typically be protected by encapsulating it with a known corrosion resistant material because the stator is stationary and has a stationary magnetic field. The rotor shaft, however, cannot be encapsulated in such a fashion without negative impact to its performance.

Accordingly, there exists a need for improved methods for providing a protective coating to a magnetic article.

BRIEF DESCRIPTION OF THE INVENTION

In one aspect, an article exhibiting magnetic properties is provided. The article comprises a substrate comprising a first portion of a magnetic material, the magnetic material exhibiting magnetic properties. The article further comprises a transition layer comprising a second portion of the magnetic material and a first portion of a coating material. The transition layer is disposed on at least a portion of the substrate. The article also comprises an outer layer comprising a second portion of the coating material. The outer layer is disposed on at least a portion of the transition layer.

In another aspect, a method for providing corrosion resistance to an article is provided. The method comprises forming a transition layer on at least a portion of a substrate. The substrate comprises a first portion of a magnetic material exhibiting magnetic properties. The transition layer comprises a second portion of the magnetic material and a first portion of a coating material. The method further comprises applying a coating layer to at least a portion of the transition layer. The coating layer comprises a second portion of the coating material.

In yet another aspect, an electric machine element is provided. The electric machine element comprises a substrate. The substrate comprises a first portion of a magnetic material, wherein the substrate exhibits magnetic properties. The substrate further comprises a transition layer comprising a second portion of the magnetic material and a first portion of a coating material. The transition layer is disposed on at least a portion of the substrate. The substrate also comprises an outer layer comprising a second portion of the coating material. The outer layer is disposed on at least a portion of the transition layer. The electric machine element further exhibits magnetic properties that are substantially similar to the magnetic properties exhibited by the substrate.

Additional aspects will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

These and other features, aspects, and advantages of the present invention will become better understood when the following detailed description is read with reference to the accompanying drawings, where the components are not necessarily to scale, and in which corresponding reference numerals designate corresponding parts throughout the drawings, wherein.

DETAILED DESCRIPTION OF THE INVENTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
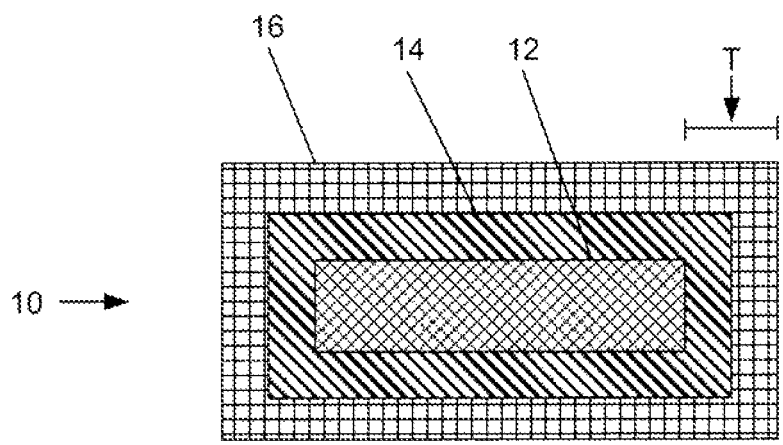
FIG. 1 illustrates a cross-sectional view of portions of an article comprising a substrate, a transition layer, and an outer layer in accordance with an embodiment of the present disclosure.
Figure 2:
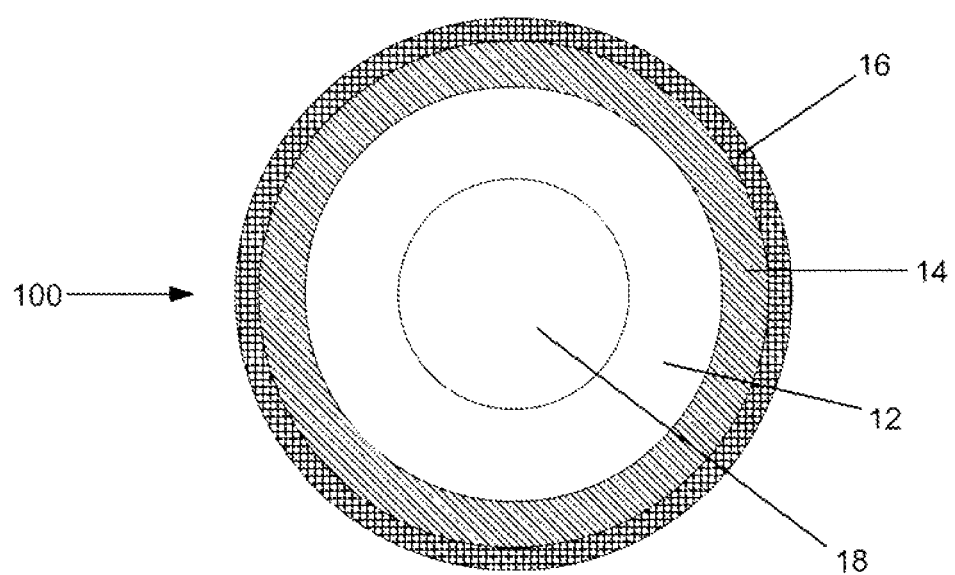
FIG. 2 illustrates a cross-sectional view of the mid-point of a magnetic bearing element disposed on a rotor shaft in accordance with an embodiment of the present disclosure.

As summarized above this disclosure encompasses an article exhibiting magnetic properties, a method of providing corrosion resistance to an article, and a magnetic bearing element. Embodiments of the disclosed subject matter are described below and illustrated in FIGS. 1 and 2. Though FIG. 1 is illustrated and described with reference to a rectangular substrate comprising a magnetic material with a protective coating, it should be understood that a substrate of any shape comprising a magnetic material and requiring a protective coating may likewise be employed or be made by alternate embodiments of the present disclosure. FIG. 2 depicts a general structure that illustrates the cross-sectional structure for both an axial bearing component and a radial bearing component.

Magnetic Article

FIG. 1 illustrates an article 10 including a substrate 12. The article 10 exhibits magnetic properties. The substrate 12 comprises a first portion of a magnetic material. The magnetic material, by definition, exhibits magnetic properties. As used herein, the term "exhibits magnetic properties" means the material has magnetic properties that may be measured using standard magnetic measuring techniques. In some embodiments, the magnetic material may comprise a metal or an alloy. In some embodiments, the magnetic material may comprise iron or iron alloys. In still other embodiments, the magnetic material may comprise a cobalt-iron alloy, silicon steel, stainless steel, or combinations thereof.

As illustrated in FIG. 1, a transition layer 14 is disposed on at least a portion of the substrate 12. In some embodiments, the transition layer 14 may be disposed on the entire surface of the substrate 12. The transition layer 14 comprises a second portion of the magnetic material and a first portion of a coating material. The second portion of magnetic material of the transition layer 14 comprises the same or same type of magnetic material as the first portion of the magnetic material of the substrate 12.

In some embodiments, the coating material may comprise tantalum, niobium, zirconium, platinum, silver, gold, or combinations thereof. In some embodiments, the transition layer 14 comprises an alloy of the magnetic material and the coating material. In still other embodiments, the coating material may comprise one metal selected from the group comprising tantalum, niobium, zirconium, platinum, silver, and gold. In other embodiments, the coating material may comprise two metals selected from the group comprising tantalum, niobium, zirconium, platinum, silver, and gold.

As further illustrated in FIG. 1, an outer layer 16 is disposed on at least a portion of the transition layer 14. In some embodiments, the outer layer 16 may be disposed on the entire surface of the transition layer 14. The outer layer 16 comprises a second portion of the coating material. The second portion of the coating material of the outer layer 16 comprises the same or same type of coating material as the first portion of the coating material of the transition layer 14. In still other embodiments, the coating material may comprise one transition metal. In other embodiments, the coating material may comprise two transition metals.

As illustrated in FIG. 1, in some embodiments the transition layer 14 and the outer layer 16 may have a total combined thickness of about 0.001 inches to about 0.02 inches, about 0.001 inches to about 0.01 inches, about 0.001 inches to about 0.005 inches, or about 0.001 inches to about 0.0025 inches. As used herein, the term "total combined thickness" means the distance from a surface of the substrate 12 to an outer surface of the outer layer 16. The total combined thickness is represented by the length T in FIG. 1. It should be carefully noted, however, that FIG. 1 is not drawn to scale and is instead depicted in a manner that assists in explanation of the disclosure.

In some embodiments, the article 10 exhibits magnetic properties that are substantially similar to the magnetic properties exhibited by the substrate 12. As used herein, the term "substantially similar" means that the magnetic properties exhibited by the article 10 vary by less than about 10%, less than about 5%, or less than about 1% from the magnetic properties exhibited by the substrate 10. Magnetic properties include, but are not limited to, the magnetic field (gauss), magnetic flux density (tesla), and magnetic field strength (ampere/meter).

In some embodiments, the transition layer 14 may cover substantially every surface of the substrate 12 and the outer layer 16 may cover substantially every surface of the transition layer 14. As used herein, the term "cover substantially every surface" means covering about 99% of the surface area, about 99.9% of the surface area, or about 99.99% of the surface area. In some embodiments, the substrate 12 may be hermetically sealed by the transition layer 14. In some embodiments, the transition layer 14 may be hermetically sealed by the outer layer 16.

Method for Providing Corrosion Resistance

In another aspect of the present disclosure a method for providing corrosion resistance to an article 10 is provided. The method comprises a first step of forming a transition layer 14 on at least a portion of a substrate 12. The substrate 12 may comprise a first portion of a magnetic material exhibiting magnetic properties. The transition layer 14 comprises a second portion of the magnetic material and a first portion of a coating material. In a second step, an outer layer 16 may then be applied to at least a portion of the transition layer 14. The outer layer 16 comprises a second portion of the coating material.

The magnetic material, by definition, has magnetic properties. In some embodiments, the magnetic material may comprise a metal or an alloy. In some embodiments, the magnetic material may comprise iron or iron alloys. In still other embodiments, the magnetic material may comprise a cobalt-iron alloy, silicon steel, stainless steel, or combinations thereof.

In some embodiments, the coating material may comprise tantalum, niobium, zirconium, platinum, silver, gold, or combinations thereof. In some embodiments, the transition layer 14 comprises an alloy of the magnetic material and the coating material. In still other embodiments, the coating material may comprise one metal selected from the group comprising tantalum, niobium, zirconium, platinum, silver, and gold. In other embodiments, the coating material may comprise two metals selected from the group comprising tantalum, niobium, zirconium, platinum, silver, and gold.

In some embodiments, the step of forming the transition layer 14 may comprise forming a metallurgical bond between the second portion of the magnetic material and the first portion of the coating material.

In an embodiment, the method of forming a metallurgical bond may comprise a first step of coating the substrate 12 comprising the magnetic material with the first portion of the coating material to form a coated substrate 12. In this step, the coating material may be applied to the substrate 12, thereby forming the second portion of the magnetic material at the interface between the coating material and the substrate 12. In a second step, the coated magnetic material may then be heated at a suitable temperature to form the transition layer 14. In some embodiments, a suitable temperature for the second step may be at a temperature in the range of about 500° C. to about 1500° C., about 750° C. to about 1350° C., or about 850° C. to about 1200° C.

In some embodiments, the coating material may be applied to the substrate 12 by a high energy method, including but not limited to chemical vapor deposition, electron beam coating, thermal spraying, plasma spraying, vacuum plasma spraying, flame spraying, high velocity spraying, cold spraying, or combinations thereof. In such embodiments, the step of applying the coating to the substrate 12 may provide sufficient thermal energy to the coated magnetic material such that the coated magnetic material is heated to a temperature that is suitable to form the transition layer 14. In some embodiments, a suitable temperature for the second step may be at a temperature in the range of about 500° C. to about 1500° C., about 750° C. to about 1350° C., or about 850° C. to about 1200° C.

In other embodiments, the coating material may be applied to the substrate 12 by a solid state method to form a powder coated substrate 12. In such embodiments, the step of coating the second portion of the magnetic material may comprise embedding the substrate 12 in a powder of the coating material, such that the second portion of the magnetic material is embedded in a powder of the first portion of the coating material. In such embodiments, the powder coated substrate 12 may then be heated to a suitable temperature to form the transition layer 14. In some embodiments, a suitable temperature for the second step may be at a temperature in the range of about 500° C. to about 1500° C., about 750° C. to about 1350° C., or about 850° C. to about 1200° C.

In some embodiments, the coating material may be applied to the substrate 12 by one or more mechanical bonding methods, wherein the first portion of the coating material is physically pressed onto the second portion of the magnetic material. Suitable techniques for physically pressing the coating material onto the substrate 12 include, but are not limited to, hot pressing, spark welding, ultrasonic bonding, roll bonding, explosive bonding, and combinations thereof. In such embodiments, after physically pressing the coating material onto the substrate 12, the article 10 may be then be heated to a suitable temperature to form the transition layer 14. In some embodiments, a suitable temperature for the second step may be at a temperature in the range of about 500° C. to about 1500° C., about 750° C. to about 1350° C., or about 850° C. to about 1200° C.

In still other embodiments, the method may further comprise using a laser to hermetically seal the edges of the transition layer 14 around the substrate 12.

Without being bound by theory, it is believed that embodiments for forming the transition layer 14 result in metallurgical bonding between the magnetic material and the coating material. The resulting article may be suitable to provide the required magnetic performance for a magnetic bearing element in harsh environments.

In a final method step, the outer layer 16 comprising a second portion of the coating material may be applied to the transition layer 14. Suitable methods for applying the outer layer 16 include, but are not limited to, thermal spraying, plasma spraying, flame spraying, high velocity spraying, cold gas dynamic spraying, laser deposition chemical vapor deposition, physical vapor deposition, electron beam physical vapor deposition, cold pressing, sintering, hot isostatic pressing, solgel processing, metallization, combinations thereof or any other suitable method for depositing the outer layer 16 onto the transition layer 14.

In some embodiments the transition layer 14 and the outer layer 16 may have a total combined thickness of about 0.001 inches to about 0.02 inches, about 0.001 inches to about 0.01 inches, about 0.001 inches to about 0.005 inches, or about 0.001 inches to about 0.0025 inches.

In some embodiments, the article 10 exhibits magnetic properties that are substantially similar to the magnetic properties exhibited by the substrate 12. As used herein, the term "substantially similar" means that the magnetic properties exhibited by the article 10 vary by less than about 10%, less than about 5%, or less than about 1% from the magnetic properties exhibited by the substrate 12. Magnetic properties include, but are not limited to, the magnetic field (gauss), magnetic flux density (tesla), and magnetic field strength (ampere/meter).

In some embodiments, the transition layer 14 may cover substantially every surface of the substrate 12 and the outer layer 16 may cover substantially every surface of the transition layer 14. As used herein, the term "cover substantially every surface" means covering about 99% of the surface area, about 99.9% of the surface area, or about 99.99% of the surface area. In some embodiments, the substrate 12 may be hermetically sealed by the transition layer 14. In some embodiments, the transition layer 14 may be hermetically sealed by the outer layer 16.

Electric Machine Element

In yet another aspect of the present disclosure an electric machine element is provided. In some embodiments, the electric machine element may comprise a component of a motor. In other embodiments, the electric machine element may comprise a component of a generator. In still other embodiments, the electric machine element may comprise a component of a magnetic bearing.

For example, an embodiment comprising a component of a magnetic bearing is depicted in FIG. 2, which illustrates a cross-sectional view of the mid-point of a magnetic bearing element disposed on a rotor shaft 18. The magnetic bearing element comprises a substrate 12. The substrate 12 comprises a first portion of a magnetic material and exhibits magnetic properties.

The substrate 12 further comprises a transition layer 14 comprising a second portion of the magnetic material and a first portion of a coating material. The transition layer 14 may be disposed on at least a portion of the substrate 12. As depicted in FIG. 2, the substrate 12 layer may be coated by the transition layer 14.

The substrate 12 further comprises an outer layer 16 comprising a second portion of the coating material. The outer layer 16 may be disposed on at least a portion of the transition layer 14. As depicted in FIG. 2, in some embodiments the outer layer 16 may be coated on the transition layer 14.

The magnetic bearing element further exhibits magnetic properties that are substantially similar to the magnetic properties exhibited by the substrate 12. As used herein, the term "substantially similar" means that the magnetic properties exhibited by the article 10 vary by less than about 10%, less than about 5%, or less than about 1% from the magnetic properties exhibited by the substrate 10. Magnetic properties include, but are not limited to, the magnetic field (gauss), magnetic flux density (tesla), and magnetic field strength (ampere/meter).

In some embodiments, the substrate 12 comprises a permanent magnet. The permanent magnet, by definition, has magnetic properties. In some embodiments, the permanent magnet may comprise a metal or an alloy. In some embodiments, the permanent magnet may comprise iron or iron alloys. In still other embodiments, the permanent magnet may comprise a cobalt-iron alloy, silicon steel, stainless steel, or combinations thereof.

In some embodiments, the coating material may comprise tantalum, niobium, zirconium, platinum, silver, gold, or combinations thereof. In some embodiments, the transition layer 14 comprises an alloy of the magnetic material and the coating material. In still other embodiments, the coating material may comprise one metal selected from the group comprising tantalum, niobium, zirconium, platinum, silver, and gold. In other embodiments, the coating material may comprise two metals selected from the group comprising tantalum, niobium, zirconium, platinum, silver, and gold.

In some embodiments the transition layer 14 and the outer layer 16 may have a total combined thickness of about 0.001 inches to about 0.02 inches, about 0.001 inches to about 0.01 inches, about 0.001 inches to about 0.005 inches, or about 0.001 inches to about 0.0025 inches.

In some embodiments, the magnetic bearing element exhibits magnetic properties that are substantially similar to the magnetic properties exhibited by the substrate 12. As used herein, the term "substantially similar" means that the magnetic properties exhibited by the magnetic bearing element vary by less than about 10%, less than about 5%, or less than about 1% from the magnetic properties exhibited by the substrate 12. Magnetic properties include but are not limited to the magnetic field (gauss), magnetic flux density (tesla), and magnetic field strength (ampere/meter).

In some embodiments, the transition layer 14 may cover substantially every surface of the substrate 12 and the outer layer 16 may cover substantially every surface of the transition layer 14. As used herein, the term "cover substantially every surface" means covering about 99% of the surface area, about 99.9% of the surface area, or about 99.99% of the surface area. In some embodiments, the substrate 12 may be hermetically sealed by the transition layer 14. In some embodiments, the transition layer 14 may be hermetically sealed by the outer layer 16.

In some embodiments, the magnetic bearing element is a component of a radial magnetic bearing. A radial magnetic bearing produces magnetic forces in radial (lateral) directions. A radial magnetic bearing may be used to keep a rotor shaft centered about a rotational axis of a machine.

In some embodiments, the magnetic bearing element is a component of an axial (thrust) magnetic bearing. An axial magnetic bearing produces magnetic forces in axial (longitudinal) directions. An axial magnetic bearing may be used to maintain the axial position of a rotor shaft in a machine.

Similarly, in some embodiments a component of a generator and/or a component of a motor may comprise layers, analogous to those describe hereinabove for a component of a magnetic bearing, to coat a substrate and exhibit magnetic properties that are substantially similar to the magnetic properties exhibited by the substrate. In other embodiments, one or more components of a generator and/or one or one or more components of a motor may comprise layers, analogous to those described hereinabove for a component of a magnetic bearing, to coat a substrate and exhibit magnetic properties that are substantially similar to the magnetic properties exhibited by the substrate.

It should be apparent that the foregoing relates only to the preferred embodiments of the present invention and that numerous changes and modifications may be made herein without departing from the spirit and the scope of the invention as defined by the following claims and equivalents thereof.

We claim:

1. An article exhibiting magnetic properties comprising:
   a single substrate comprising a first portion of an iron-containing magnetic material, the iron-containing magnetic material exhibiting magnetic properties;
   a transition layer comprising a second portion of the iron-containing magnetic material and a first portion of a coating material, the transition layer disposed on and completely surrounding the single substrate; and
   an outer layer consists essentially of a second portion of the coating material, the outer layer disposed on and completely surrounding the transition layer, the transition layer completely separating the single substrate from the outer layer;
   wherein the transition layer is in contact with and hermetically seals the single substrate,
   wherein the outer layer is in contact with and hermetically seals the transition layer, and
   wherein the first and second portions of the coating material consist essentially of one or more metals selected from the group consisting of tantalum, niobium, zirconium, platinum, silver and gold.

2. The article of claim 1, wherein the coating material comprises tantalum.

3. The article of claim 1, wherein the transition layer and the outer layer have a total combined thickness of about 0.001 inches to about 0.005 inches.

4. The article of claim 1, wherein the article exhibits magnetic properties that are substantially similar to the magnetic properties exhibited by the single substrate.

5. An electric machine element comprising:
   a single substrate comprising a first portion of an iron-containing magnetic material, wherein the single substrate exhibits magnetic properties;
   a transition layer comprising a second portion of the iron-containing magnetic material and a first portion of a coating material, the transition layer disposed on and completely surrounding the single substrate; and
   an outer layer consists essentially of a second portion of the coating material, the outer layer disposed on and completely surrounding the transition layer, the transition layer completely separating the single substrate from the outer layer;
   wherein the electric machine element exhibits magnetic properties that are substantially similar to the magnetic properties exhibited by the single substrate,
   wherein the transition layer is in contact with and hermetically seals the single substrate,
   wherein the outer layer is in contact with and hermetically seals the transition layer, and
   wherein the first and second portions of the coating material consist essentially of one or more metals selected from the group consisting of tantalum, niobium, zirconium, platinum, silver and gold.

6. The electric machine element of claim 5, wherein the electric machine element comprises a component of a motor.

7. The electric machine element of claim 5, wherein the electric machine element comprises a component of a generator.

8. The electric machine element of claim 5, wherein the electric machine element comprises a component of a magnetic bearing.

* * * * *